United States Patent [19]

Mullen

[11] Patent Number: 4,921,741

[45] Date of Patent: May 1, 1990

[54] RECREATION SURFACE AND TILE FASTENING SCHEME

[75] Inventor: Paul A. Mullen, Loysville, Pa.

[73] Assignee: Carlisle Tire & Rubber Company, Carlisle, Pa.

[21] Appl. No.: 209,580

[22] Filed: Jun. 21, 1988

[51] Int. Cl.⁵ .............................................. B32B 3/16
[52] U.S. Cl. ..................................... 428/48; 428/172; 428/188; 404/32
[58] Field of Search ....................... 428/45, 47, 48, 44, 428/166, 188, 51, 172; 404/36, 32, 33; 52/390

[56] References Cited

U.S. PATENT DOCUMENTS

| | | |
|---|---|---|
| 1,857,856 | 5/1932 | Medina . |
| 2,129,622 | 9/1938 | Manchester ............................ 404/32 |
| 2,147,362 | 2/1939 | Bloomberg ............................ 404/32 |
| 2,887,867 | 5/1959 | Burchenal et al. . |
| 3,828,503 | 8/1974 | Hofmann ............................... 52/390 |
| 3,862,874 | 1/1975 | Hopper et al. ........................ 428/47 |
| 4,044,179 | 8/1977 | Haas, Jr. ................................ 428/17 |
| 4,387,130 | 6/1983 | See ........................................ 428/47 |
| 4,468,910 | 9/1984 | Morrison ........................... 428/45 X |
| 4,679,963 | 7/1987 | Heath .................................... 405/36 |

Primary Examiner—Alexander S. Thomas
Attorney, Agent, or Firm—Wood, Herron & Evans

[57] ABSTRACT

The present invention is directed to a recreation surface which consists of a plurality of resilient, liquid-porous tiles adhered to a liquid-porous sheet that overlies a porous sub-surface and is anchored to the ground. In this way, the tiles are fixed and displacement or removal thereof is inhibited; additionally the porous tiles and sheet facilitate drainage of water from the recreation surface into the porous subsurface.

4 Claims, 1 Drawing Sheet

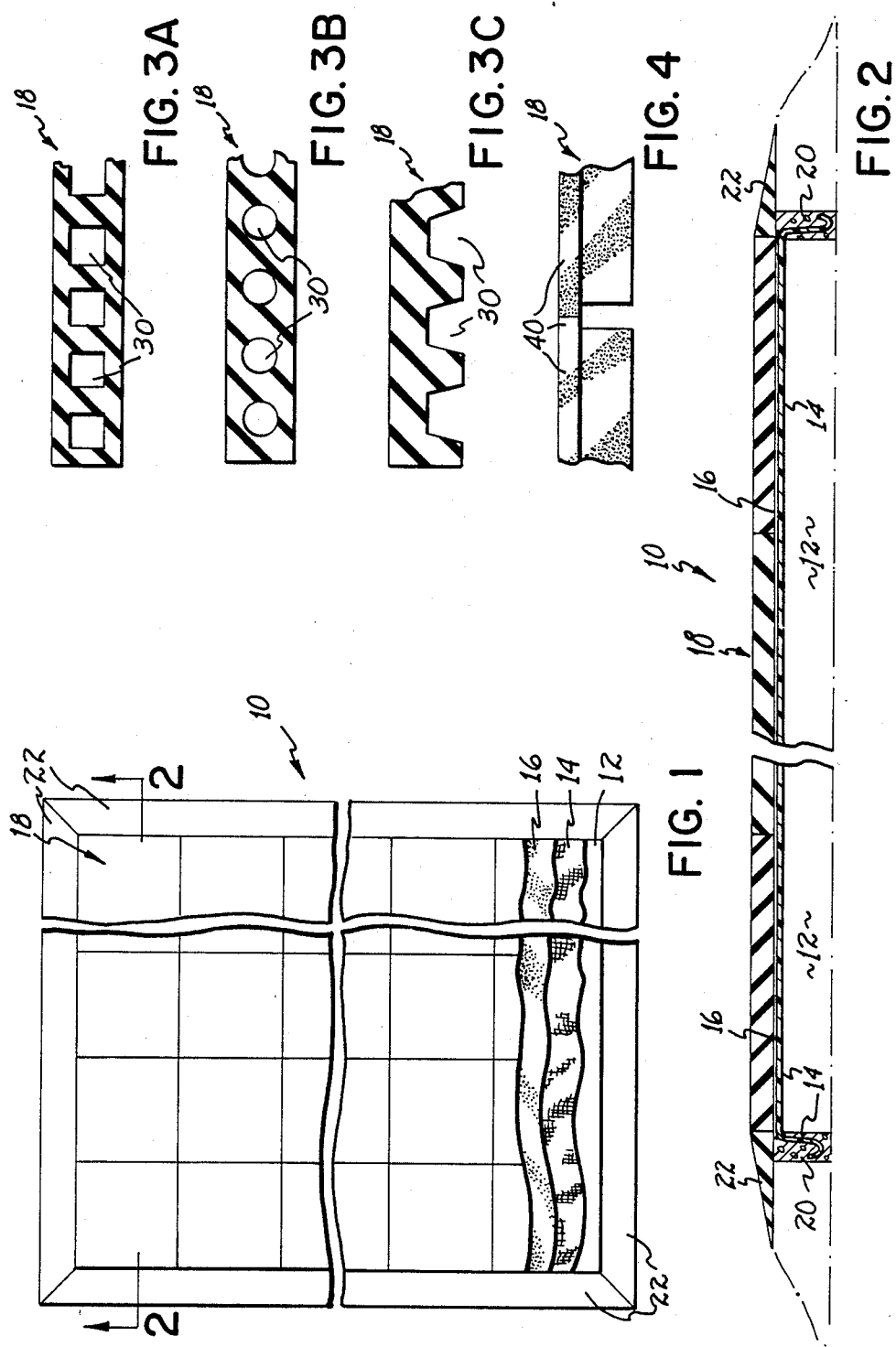

RECREATION SURFACE AND TILE FASTENING SCHEME

This invention relates to a new recreation surface, and more particularly to a scheme for fastening the tiles in place.

Statistics from the U.S. Consumer Product Safety Commission indicate that the majority of playground-related injuries are caused when children fall from equipment and strike the underlying surface. Nearly half the injuries that result from falls are to the head, and range in severity from minor bruises to skull fractures, concussions, brain damage, and even death. Studies indicate that, while they may require little maintenance or repair, hard surfacing materials such as asphalt and concrete do not provide adequate injury protection from accidental falls and are therefore unsuitable for use under playground equipment. Another type of surface which is commonly used around playground equipment is a layer of loose material such as bark nuggets, bark mulch, shredded bark or cocoa shell mulch. The cushioning potential of these materials depends upon the air trapped within and between the individual particles. Therefore, when the materials decompose or become pulverized over a period of time, or mix with dirt, they tend to lose their cushioning effect. Cushioning protection also decreases in rainy or humid weather when the materials absorb moisture and become packed down, or if the temperature drops and the wet materials freeze. Furthermore, because strong winds can erode these materials, thereby reducing the thickness available to protect against injury, and because the playing action of children can push the protective materials away from fall areas, frequent grading and leveling are necessary to maintain sufficient depth to provide the necessary protection.

Certain other types of loose materials, for example, sand, pea gravel and shredded tire rubber, are also used around playground equipment. As with the previously mentioned surfacing materials, however, these materials also require frequent leveling to replace material that is pushed or blown away from fall areas, and grading or sifting to remove foreign matter. Also, moisture tends to make these materials more cohesive and therefore less cushioning. For example, sand loses virtually all resiliency when it becomes wet.

Another category of surfacing materials includes outdoor rubber mats, foam rubber gym mats and synthetic turf. Generally, the cushioning properties of these materials will depend upon the foundation or surface over which the material is installed. Although surface materials of this type require very little maintenance, they are oftentimes the subject of vandalism, such as removal or displacement.

SUMMARY OF THE INVENTION

The present invention is directed to a recreation surface which is made up of a plurality of resilient, liquid-porous rubber tiles that possess superior shock-absorbance and are suitable for use around playground equipment. The invention is more particularly directed to a scheme for fastening the tiles in place which significantly reduces the opportunity for vandals to remove or displace the tiles, which allows the tiles to be used over a rough surface, such as broken-up asphalt, and which promotes drainage to avoid accumulation of water on the recreation surface.

In accordance with the general principles of this invention, there is disclosed a recreation surface which consists of a plurality of resilient, liquid-porous tiles which are arranged on and adhered to a liquid-porous sheet that is anchored to the ground over a porous subsurface, such as sand or broken-up asphalt. The tiles may have dimples in their bottom surface which increase the resiliency of the tiles; in that case, the sheet serves the dual purpose of promoting drainage of the recreation surface while preventing sand from packing in the dimples and thereby reducing the resiliency of the tiles.

In a preferred form, the recreation surface of the present invention consists of a plurality of resilient liquid-porous tiles made of rubber crumbs bound together with a suitable binding material, preferably a polyurethane binder, and molded into generally square tiles. For purposes of this description, the tiles as described are square; however, it should be appreciated that tiles of various other shapes may be advantageously employed for recreation surfaces as described herein. The tiles are molded and have a substantially uniform overall thickness, as defined by upper and lower surfaces, and front, rear, right and left side edge surfaces. The tiles may have a peripheral expansion lip adjacent their upper surface which extends around the perimeter of the tile. The expansion lip is relatively thin and narrow as compared to the tile as a whole and deforms during periods of expansion of the tiles to prevent buckling of the entire recreation surface. In addition, the tiles may have a plurality of "cores" therein which add resiliency, reduce the amount of materials needed per tile and reduce the weight of each tile. These cores can take a variety of forms including dimples in the bottom surface and channels of any suitable cross-section through the tile.

The recreation surface of the present invention further consists of a liquid-porous sheet, which is laid out over the surface to be covered, a layer of adhesive material, preferably a polyurethane adhesive, which adheres the tiles to the sheet, and a plurality of resilient tiles (as described above) which may be adhered to the sheet in a two-dimensional array of perpendicularly directed columns and rows. The underlying porous sheet serves several important purposes. First, it prevents the underlying sand or dirt from filling in the cores in the tiles which are open to the bottom surface of each tile. Second, it provides a more uniform surface for adhering the tiles when the underlying surface is broken-up asphalt or concrete. Third, due to its porous nature, the sheet permits water which has filtered through the tiles to pass through the sheet for drainage to the underlying sand or broken asphalt surface. Finally, the edges of the sheet are immobilized, for example, by embedding them in a concrete footing around the perimeter of the surface, thereby anchoring the tiles in place to resist displacement or removal.

BRIEF DESCRIPTION OF THE DRAWINGS

FIG. 1 is a top view of a two dimensional array of tiles, partially cut away.

FIG. 2 is a cross-sectional taken in lines 2—2 of FIG. 1 of a recreation surface in its environment.

FIGS. 3(A)–(C) show several embodiments of tiles with coring.

FIG. 4 is a side view of confronting tiles which have peripheral expansion lips.

DETAILED DESCRIPTION OF THE INVENTION

FIG. 1 shows a top view of a recreation surface with portions cut away to show the constituent layers. As shown, the recreation surface 10 is in place over a sand base 12; however, it will be appreciated that the underlying surface may be of any type of material, including broken asphalt. Liquid-porous sheet 14 is placed over the sand base 12 and adhesive 16 adheres tiles 18 to sheet 14. As shown in FIG. 2, the edges of sheet 14 are immobilized, for example, by embedding them in a concrete footing 20 which extends around the perimeter of the surface 10. Concrete footing 20 may be covered by tapered sections 22 of the same resilient material which makes up the tiles 18.

FIGS. 3(A)–(B) show alternative embodiments of tiles 18 which have cores 30 therein. The cores 30 may take the form of dimples in the bottom surface of the tile or they may be channels of any suitable cross-section that pass through the tiles, as shown in FIGS. 3(A)–(C). Additionally, as shown in FIG. 4, the tiles 18 may have peripheral expansion lips 40 thereon which deform during expansion of the recreation surface 10 and prevent the surface from buckling.

While the invention has been described in detail with respect to a preferred embodiment thereof, it will be understood by those skilled in the art to which the invention pertains that numerous changes may be made in the invention without departing from the spirit and scope thereof.

What is claimed is:

1. A recreation surface comprising:
   a liquid-porous sheet having an upper and lower surface;
   a plurality of liquid-porous resilient tiles, each said tile having a substantially uniform overall thickness, as measured in the vertical direction, and defined by upper and lower surfaces and front, rear, right and left side edge surfaces, said liquid-porous tiles and said liquid-porous sheet promote drainage to avoid accumulation of water on said upper surface of said tiles; and
   adhesive means securing said tiles to said sheet in edge-to-edge, abutting relationship.

2. A recreation surface as in claim 1 further comprising means for anchoring the edges of said sheet to the ground.

3. A recreation surface as in claim 1 wherein said liquid-porous sheet is laid over a bed of sand.

4. A recreation surface as in claim 3 wherein each said resilient tile has a plurality of cores which extend vertically from said lower surface a distance less than the thickness of said tile for increasing the resiliency of said tile and wherein said liquid-porous sheet permits liquid drainage while preventing said sand from packing into said cores and decreasing the resiliency of said tile.

* * * * *